United States Patent [19]

Santilli

[11] 4,358,400
[45] Nov. 9, 1982

[54] RESIDUAL OIL PROCESSING CATALYSTS
[75] Inventor: Donald S. Santilli, Pinole, Calif.
[73] Assignee: Chevron Research Company, San Francisco, Calif.
[21] Appl. No.: 224,712
[22] Filed: Jan. 12, 1981
[51] Int. Cl.$^3$ .................. B01J 20/12; B01J 21/16
[52] U.S. Cl. ...................... 252/455 R; 252/458; 252/459
[58] Field of Search ................ 252/449, 455 R
[56] References Cited
U.S. PATENT DOCUMENTS 3,235,512  2/1966  Koepernik ............... 252/455 R
3,891,541  6/1975  Oleck et al. ............... 208/89
3,966,641  6/1976  Csatar et al. ............. 252/449
4,098,676  7/1978  Robson ..................... 208/111
4,152,250  5/1979  Inooka et al. ............ 208/251 H
4,166,026  8/1979  Fukui et al. .............. 208/210

Primary Examiner—Carl F. Dees
Attorney, Agent, or Firm—D. A. Newell; S. R. LaPaglia; C. L. Hartman

[57] ABSTRACT

A porous ceramic composition suitable for use as a catalyst support for demetalation of asphaltene-containing feedstocks is made from the tubular form of the clay halloysite by dispersing the rods of the clay.

4 Claims, No Drawings

RESIDUAL OIL PROCESSING CATALYSTS

BACKGROUND OF THE INVENTION

This invention relates to a catalyst for hydrotreatment and hydrodemetalation of hydrocarbonaceous feedstocks. More particularly, this invention relates to catalysts and catalyst supports fabricated from halloysite.

Impurities such as metals, sulfur and nitrogen are contained in hydrocarbonaceous materials including crude oils, heavy oils, cracked oils, deasphalted oils, residual oils, shale oils, coal and partially liquefied coal and the like. These impurities are discharged into the atmosphere when the hydrocarbon is burned, creating a major source of pollution. They also tend to rapidly foul catalysts used for processing of the hydrocarbon or treating the exhaust from combusted hydrocarbons. The removal of these undesirable impurities as early as possible in the processing of the hydrocarbonaceous materials is therefore highly desirable.

When metals such as nickel, iron and vanadium are present, they tend to deposit on the interior surface of the pores of hydroprocessing catalysts, tending to plug the pore mouths thereby reducing activity. It is desirable, therefore, that a substantial volume of the pores have a pore mouth diameter greater than 200 Angstroms. The majority of the pores should be preferably smaller than about a 1000 Angstroms because large pores tend to decrease the mechanical crush strength of the catalyst bodies, and also decrease surface to volume ratios.

Catalysts that effectively treat asphaltene containing fractions are desirable because many known crude oil reserves worldwide are high in asphaltenes. Additionally, various synthetic fuel processes tend to create fractions high in asphaltenes.

Catalysts containing clay materials have been suggested for hydroprocessing heavy hydrocarbon feeds. For example, U.S. Pat. No. 4,152,250 to Inooka suggests the use of a catalyst containing the mineral sepiolite (Meershaum), a fibrous magnesium silicate clay and transition metals and/or Group II-B metals. Another clay which has been suggested is halloysite. Halloysite is an aluminum silicate clay that frequently occurs naturally in a rod like form. The basic formula is $Al_2Si_2O_5(OH)_4$.

In U.S. Pat. No. 4,098,696, a synthesis of the plate form of halloysite is disclosed. In U.S. Pat. No. 3,891,541 a demetalation catalyst is disclosed that is formed from halloysite and alumina. The pore structure contains pores with a diameter of between about 180 Angstroms to about 300 Angstroms. The pore diameters are said to be an artifact of the alumina.

SUMMARY OF THE INVENTION

This invention provides a method for the hydroprocessing of hydrocarbonaceous feedstocks containing asphaltenes. It also provides a catalyst and catalyst support useful, for example, in hydroprocessing hydrocarbonaceous feedstocks containing asphaltenes.

These and other objects are achieved in a porous composition of matter having dispersed rods of halloysite and from 0-15 percent by weight of a binder oxide. The weight percentage is based on the total weight of both the halloysite and the binder oxide. It is preferred that the composition include at least one catalytic transition metal preferably a metal selected from Group VI-B or VIII of the Periodic Table. It is preferred that the binder oxide be alumina. It is preferred that the composition have a pore volume of at least 0.35 cc/g of which at least 70 percent of the pore volume is present in pores having a diameter of 200–700 Angstroms and at least 70 percent of those pores have diameters of 300–700 Angstroms. Hydrocarbon feedstocks containing at least one percent by weight asphaltenes can be processed by contacting feedstocks with hydrogen under hydroprocessing conditions in the presence of a catalyst composition comprising dispersed rods of halloysite and between 0-15 weight percent of a binder oxide.

DETAILED DESCRIPTION

The catalyst composition of the present invention involves the rod form of halloysite processed so that the rods are dispersed. "Dispersed rods" are defined herein to mean rods of halloysite which have been substantially completely disassociated from one another and are substantially randomly oriented with respect to one another.

The tubular or rod form of halloysite is readily available from natural deposits. It frequently comprises bundles of tubular rods or needles consolidated or bonded together in a weakly parallel orientation. It has been discovered that if these bundles of rods are broken up by mechanical means and re-oriented in a substantially random orientation with respect to one another, a catalyst support with superior asphaltene hydroconversion properties results. Halloysite occurs naturally in tubular rods that are approximately 1 micron long and 0.1 micron in diameter with a centrally located hole penetrating the rod from about 100 Angstroms to about 300 Angstroms in diameter resulting in a scroll-like rod, in contrast to fibrous clays like attapulgite and sepiolite which are nontubular. The exact dimensions vary from rod to rod and are not critical. It is critical that the rod form, rather than the platy form, of halloysite be used.

In addition to the halloysite component of the present catalyst, an inorganic binder oxide may be added. Inorganic binder oxides are defined as refractory inorganic oxide such as, silica and oxides of elements in Group 2a, 3b and 3a of the Periodic Table as defined in Handbook of Chemistry and Physics, 45th Edition. Preferable binder oxides include: silica, alumina, magnesia, zirconia, titania, boria and the like. An especially preferred binder oxide is alumina. It has been discovered that the amount of asphaltene adsorbed onto a catalyst support of dispersed rods of halloysite is related to the amount of binder oxide used. When the amount of binder oxide exceeds about 15 percent of the total weight of halloysite and binder oxide, the amount of asphaltenes adsorbed is severely reduced. It has been found that an especially preferable amount of binder oxide is about 5 percent. As more binder oxide is added to the catalyst support, the pore sizes tend to cluster around smaller distributions. A catalyst support with 25 percent alumina has substantially all of its pores less than 100 Angstroms in diameter.

A catalyst support made from halloysite can contain any catalytic reactive transition metal. The catalytic metal component can be added during any stage of preparation. Catalytic metals can be added as powdered salts or oxides during the agitation stage or by impregnation of the catalyst body by adding a metal containing solution after the catalyst bodies have been formed.

Preferred catalytic metals are those of Groups VI-B and VIII of the Periodic Table. When preparing hydroprocessing catalysts, it is preferable that the composition include at least one metal of the group of chromium, molybdenum, tungsten and vanadium, and at least one metal of the group of iron, nickel and cobalt, such as cobalt-molybdenum, nickel-tungsten or nickel-molybdenum.

Preparation of the catalyst with dispersed rods is accomplished by creating a mixture of tubular halloysite and if desired, binder oxide and enough water to form a slurry of about 20 weight percent solid content. As the mixture is violently agitated the slurry is observed to thicken. Agitation is continued until the slurry stops getting thicker with continued agitation. This takes about 10 minutes of agitation. This thickening is indicative of dispersal of the rods. Excess water in the slurry is removed by evaporation until a moldable plastic mass is formed. The bodies are then shaped by spheridizing, pelletizing and similar procedures and then calcined. It has been observed that a catalyst body made of dispersed rods of halloysite tends not to extrude well. The rods tend to realign on the surface of the extruded mass, and this skin effect decreases the average pore diameter at the surface of the extruded mass. Alternatively, the halloysite mass can be dried and calcined; and the calcined mass broken up to produce catalyst bodies. The final product is a catalyst body with the characteristics of dispersed rods of halloysite. It is preferable that the binder oxide be added to the halloysite as the gel or the sol precursor to the gel at the agitation stage of the slurry.

Referring to Table I, the pore size distribution for unprocessed halloysite and pore size distribution for halloysite with dispersed rods are compared. It will be noted that in unprocessed halloysite most of the pore size is in the 200-400 Angstrom range. On the other hand, halloysite with dispersed rods has most of it pores distributed from 400-600 Angstroms. In halloysite with dispersed rods there is a substantial amount of pore volume provided by pores having diameters in the range of 100-300 Angstroms. It is believed that these pores are from the central hole present in halloysite rods. The presence of these smaller pores is not a gauge of the thoroughness of dispersion of the rods.

TABLE I

Pore Size Distribution
(Expressed as percentage of Total Pore Volume)

| Pore Size Diameter | Unprocessed | With Dispersed Rods |
|---|---|---|
| >600 Angstroms | 4% | <1% |
| 500-600 Angstroms | 2% | 22% |
| 400-500 Angstroms | 13% | 29% |
| 300-400 Angstroms | 19% | 18% |
| 200-300 Angstroms | 44% | 14% |
| <200 Angstroms | 17% | 17% |
| Total Pore Volume | .26 cc/g | .39 cc/g |

It will also be noted that the halloysite with dispersed rods has a substantially greater total pore volume than the natural halloysite.

It is believed that the pores in the range of 200 Angstroms to about 700 Angstroms impart especially good deasphalting properties to the catalyst support. One explanation is that demetalation and desulfurization reactions tend to be fast, therefore, pores significantly larger than the molecules tend to allow rapid diffusion into and out of the pores. Large pores are preferable in demetalation catalysts since the metals removed from the feedstocks tend to deposit on the surface of the catalyst support, thereby rapidly plugging the mouths of the smaller pores. Since there is no substantial amount of pore volume in pores greater than 1000 Angstroms, there is less problem with mechanically weak catalyst bodies and attendant attrition.

The catalyst support and catalyst of this invention are versatile and can be used for conversion of a variety of hydrocarbonaceous feeds. This catalyst is especially useful in hydroprocessing of heavy fractions which contains more than one percent by weight aphaltenes. Asphaltenes are defined herein to mean any hydrocarbon fraction that is insoluble in n-heptane whether or not it is soluble in benzene. Any feedstock containing asphaltenes can be treated by use of this catalyst whether or not the asphaltenes have been previously separated from the remainder of the feedstock.

The feedstocks with more than about 10 percent asphaltenes are especially suitable for upgrading by use of the present invention. Suitable feedstocks include those oils that have an API gravity below about 25° or a Conradson carbon residue of at least 7 percent. Particularly suitable are those feedstocks that boil at greater than 550° C. Suitable feedstocks include: crude petroleum, vacuum and atmospheric residua from petroleum, coal-liquids, shale oil, topped crudes and the like.

The present invention is especially suitable for any of the numerous hydroconversion processes that use molecular hydrogen. The generic conditions are exposing the feedstock to hydrogen at a partial pressure ranging from 0 to 200 atmospheres at between 200° C. and 540° C., and hydrogen to oil feed ratio of from zero to 9,000 standard cubic liters per liter of oil and an hourly liquid space velocity from about 0.1 to about 25 reciprocal hours. Among the specific uses for which this catalyst is suitable are hydrocracking, hydrodesulfurization, hydrodenitrification, hydrodemetalation, and hydroconversion of asphaltenes. The present catalyst is especially suitable for hydrodemetalation and hydrocracking of asphaltenes.

The following examples are for illustrative purposes only and should not be considered to be limiting.

EXAMPLE I

This example illustrates the preparation of a catalyst support containing only halloysite without a binder oxide or catalytic metals.

Naturally occurring halloysite from Dragon Iron Mine, Utah, #13 powder is placed in a blender with enough water to make a slurry of about 20 weight percent solid content. The slurry is visorously agitated in a Waring blender until it reaches a constnt thickness. After removal from the blender, the clay containing slurry is dried and calcined and shaped into catalytic bodies.

EXAMPLE II

This example illustrates preparation of a catalyst support containing halloysite and a binder oxide. Dragon Halloysite #13 powder is placed in a blender. Enough 5 percent alumina by weight alumina hydrogel is added to form a mixture that is 5 percent by dry weight alumina. The alumina hydrogel is prepared conventionally, as by peptizing a commercially available alumina by a vigorous agitation with a peptizing agent such a nitric acid or formic acid, or by precipitation of the hydrogel from an aluminum nitrate solution with a base such as ammonium hydroxide. Enough water is then added to make a slurry that is no more than about 20 percent solid content. The mixture is then vigorously agitated in a Waring blender until the slurry no longer visibly thickens. Once the halloysite rods are adequately dispersed, the slurry will not get any thicker. Normally this takes about 10 minutes of agitation. Excess water is evaporated from the slurry to form a plastic, workable mass. The mixture is heated to 500° C. for three hours and the calcined mass is broken up into catalyst particles.

EXAMPLE III

This example illustrates the deasphaltening properties of a catalyst support made from dispersed rods of halloysite.

A calcined catalyst support prepared by the general method illustrated in Example I was impregnated by a solution of phosphomolybdic acid and cobalt nitrate. The impregnated catalyst contained 2 percent by weight of cobalt and 6 percent by weight of molybdenum. The support was employed for hydrodemetalizing a feedstock comprising Arabian Atmospheric Residue in a microreactor. The temperature was 382° C., the pressure of hydrogen was 112 atmospheres, the hydrogen flow was 90 standard liters per liter of feed and the liquid hourly space velocity was 0.86 reciprocal hours. The concentration of impurities in the feedstock was reduced after hydrogen processing the feedstock in the presence of the catalyst. Table II shows the concentrations of the impurities in the feedstock before and after hydrodemetalation.

TABLE II

|  | V,ppm | N,ppm | % S | % Asphaltene |
|---|---|---|---|---|
| Feed | 83 | 22 | 4.4 | 7.2 |
| Product | 57 | 18 | 3.9 | 5.3 |

Table III shows the concentrations of impurities in the asphaltene fraction of the feedstocks when the heptane insoluble asphaltenes are separated and analyzed separately.

TABLE III

|  | V,ppm | N,ppm | % S |
|---|---|---|---|
| Asphaltenes From Feed | 1030 | 300 | 10.5 |
| Asphaltenes From Product | 760 | 250 | 8.8 |

It will be appreciated that the asphaltene left behind was cleaner than the asphaltene in the initial feedstock.

Analysis of the catalyst particles revealed that the metals deposited on the catalyst support tended to be evenly distributed throughout the particles, rather than on the surface only.

EXAMPLE IV

A series of catalysts were made according to the general method of Example II except that varying amounts of alumina were used in each preparation. The catalysts were than placed in toluene solutions of asphaltenes and the absorbance at 550 nm is monitored with respect to time according to the method of Saint-Just (*Ind. Eng. Chem. Prod. Res. Div.* 1980, 19, 71). 550 nm is chosen because the absorbance of this wavelength of light has been correlated to the concentration of vanadium, which in turn has been correlated to the concentration of asphaltenes.

Table IV shows the absorbance of light at 550 nm at varying time intervals for various halloysite catalysts that have varying amounts of alumina. As the catalyst adsorbs asphaltenes, the solution becomes progressively more clear, therefore, absorbing less light. Therefore, the better catalyst compositions for deasphaltening action will have lower final light absorbances.

TABLE IV

|  | Time (Minutes) | | | | | |
|---|---|---|---|---|---|---|
|  | 0 | 5 | 10 | 15 | 20 | 30 |
| Halloysite with 0% alumina | 1.0 | 0.28 | 0.14 | 0.08 | 0.06 | 0.04 |
| Halloysite with 5% alumina | 1.0 | 0.22 | 0.01 | 0.05 | 0.04 | 0.03 |
| Halloysite with 10% alumina | 1.0 | 0.67 | 0.56 | 0.49 | 0.43 | 0.36 |
| Halloysite with 25% alumina | 1.0 | 1.0 | 1.0 | 1.0 | 1.0 | 1.0 |
| Halloysite with 5% alumina (extruded) | 1.0 | 0.92 | 0.85 | 0.82 | 0.79 | 0.73 |

It can be seen that the best asphaltene absorbance is for the catalyst composition with 0–5 percent alumina content, and asphaltenes are absorbed progressively more poorly for the catalyst supports with higher amounts of alumina. The extruded halloysite shows decreased light absorbance with time, indicating that asphaltene absorption onto the catalyst support is taking place, but it is considerably inferior to the 5 percent alumina catalyst that has been shaped by alternate means. This is apparently due to a skin effect on the extruded catalyst body that tends to realign the dispersed rods during extrusion. The results of this absorbance test can be roughly correlated to the pore size distribution of the catalyst support, which should be large enough to adsorb molecules the size of asphaltene molecules. It will also be noted that there is no decrease in light adsorbance in the 25 percent alumina catalyst. It is thought that the pore sizes are too small to allow the catalyst body to preferentially adsorb asphaltenes. The light absorbance characteristics of this series of dispersed rod catalysts indicate that dispersed rods of halloysite can be superior catalyst supports for hydroprocessing if the catalyst support contains no more than about 15 percent binder oxide.

What is claimed is:

1. A porous composition of matter comprising: dispersed rods of halloysite, and 0–15 percent by weight of a binder oxide, based on the total weight of said halloysite and binder oxide having a pore volume of at least 0.35 cc/gm of which at least 70 percent of the pore volume is present as pores having a diameter of between 200–700 Angstroms and at least 70 percent of said pores have a diameter of 300–700 Angstroms.

2. The composition of claim 1 further comprising a catalytic transition metal.

3. The composition of claim 2 further comprising at least one metal selected from Group VI-B and Group VIII of the Periodic Table.

4. The composition of claims 1, 2 or 3 wherein said binder oxide is alumina.

* * * * *